(12) United States Patent
Zickell

(10) Patent No.: US 7,488,522 B2
(45) Date of Patent: Feb. 10, 2009

(54) FIRE-RESISTANT, SELF-ADHESIVE ROLLED ROOFING MEMBRANE AND METHOD OF MAKING SAME

(75) Inventor: Thomas Zickell, Stratham, NH (US)

(73) Assignee: Northern Elastomeric, Inc., Brentwood, NH (US)

( * ) Notice: Subject to any disclaimer, the term of this patent is extended or adjusted under 35 U.S.C. 154(b) by 0 days.

(21) Appl. No.: 09/898,707

(22) Filed: Jul. 3, 2001

(65) Prior Publication Data

US 2003/0008094 A1    Jan. 9, 2003

(51) Int. Cl.
*B32B 9/00* (2006.01)

(52) U.S. Cl. .................. 428/40.1; 428/40.3; 428/41.8; 428/141; 428/143; 428/150; 428/906

(58) Field of Classification Search .............. 428/40.1, 428/40.3, 41.8, 42.1, 141, 143, 145, 150, 428/906; 442/48, 85, 180, 282
See application file for complete search history.

(56) References Cited

U.S. PATENT DOCUMENTS 4,079,158 A * 3/1978 Kennepohl et al. .......... 428/143
5,079,088 A * 1/1992 McGroarty et al. .......... 428/331
5,096,759 A * 3/1992 Simpson et al. .............. 428/40

* cited by examiner

*Primary Examiner*—Rena L Dye
*Assistant Examiner*—Walter B Aughenbaugh
(74) *Attorney, Agent, or Firm*—Bourque and Associates

(57) ABSTRACT

A fire resistant, self-adhesive rolled roofing membrane is used on low sloped roofs for insulating a surface from weather. The roofing membrane includes an asphalt-saturated fibrous material having a roofing surface area, for example, roofing granules on a portion of the top surface and a clean surface area on another portion of the top surface. The roofing membrane includes an adhesive surface area on a portion of the bottom surface opposite the roofing surface area and a parting agent covered surface area on another portion of the bottom surface generally opposite the clean surface area to prevent adhering to the clean surface area when rolled. The adhesive surface area includes a layer of self-adhesive material, such as rubberized asphalt, capable of adhering to the clean surface area when strips of the roofing membrane are overlapped. The adhesive surface area is covered with a release backing to prevent adherence to the roofing surface area. The fibrous material is saturated with an oxidized asphalt with mineral filler and the rubberized asphalt adhesive material is minimized to provide fire resistance.

22 Claims, 2 Drawing Sheets

FIRE-RESISTANT, SELF-ADHESIVE ROLLED ROOFING MEMBRANE AND METHOD OF MAKING SAME

FIELD OF THE INVENTION

This invention relates to protective membranes and more particularly, to a self-adhesive, fire resistant roofing membrane that provides a water-proof seal for a surface such as a low sloped roof. The present invention also features a novel method for making and installing such a rolled roofing membrane.

BACKGROUND OF THE INVENTION

Rolled roofing products are well known in the roofing industry. These products are suitable for low sloped roofs where traditional shingle roofing products may be inappropriate. Low sloped roofs are generally not visible from the ground. Rolled roofing products are also inexpensive compared to shingles. Accordingly, rolled roofing products are desirable for low sloped roofs where the aesthetic advantage of more expensive shingles is not necessary. Shingles are also not appropriate on low sloped roofs where the pitch is not great enough for water to quickly flow off the roof. This permits water to seep behind the shingles and leak through the roof.

Low sloped roofs are often used to cover and protect wooden decks of residential homes. The decks are generally for seasonal use and not subject to the same stringent residential home building codes. This makes building wooden decks by homeowners an attractive option. As such, rolled roofing products are a suitable covering for wooden deck roofs because they are inexpensive and capable of being installed by homeowners.

Rolled roofing products have an adhesive between the overlap formed between succeeding strips of the roofing material forming a water-proof seal. The adhesive also prevents wind from uplifting and separating the roofing material. Typically, rolled roofing products are either entirely coated with roofing granules on the top surface or only the exposed portion of the top surface is coated with roofing granules. In the first case, the roofing granules in the overlap area prevent strong adhesion between overlapping layers making the product susceptible to separation in high winds. In the second case, a parting agent is required to prevent the asphalt from sticking in the rolls. The parting agent interferes with adhesion between layers, however, making the product susceptible to separation in high winds.

Self-adhesive rolled roofing material also typically uses an adhesive high in oil content and readily flowable making the adhesive combustible. To obtain a self-adhesive rolled roofing product having a UL class B or C fire rating, expensive chemical fireproofing agents must be added to the product. These additives can significantly increase the price of self-adhesive rolled roofing products.

Accordingly, what is needed is a self-adhesive, light weight, watertight, rolled roofing product which is resistant to fire without adding expensive chemical fireproofing agents; which has strong adhesion between layers when applied to a roof; and which is relatively easy to install.

SUMMARY OF THE INVENTION

The present invention features a rolled covering material for use in covering a surface by overlapping strips of the covering material. The rolled covering material comprises a substrate having upper and lower surfaces. An asphalt composition saturates the substrate and coats a portion of the upper surface of the substrate to form a decorative surface area and a clean surface area on the upper surface of the substrate. A decorative material is adhered to the asphalt composition on the decorative surface area. An adhesive composition is disposed on at least a portion of the bottom surface of the substrate to form an adhesive surface area. The adhesive surface area is capable of adhering to the clean surface area when overlapping strips of the covering material are applied to cover the surface such that the decorative surface area is exposed. A release backing is disposed over the adhesive surface area for preventing the adhesive surface area from adhering to the decorative surface area when the covering material is rolled.

In one embodiment, a parting agent covers another portion of the bottom surface of the substrate to form a parting agent covered surface area that resists adhering to the clean surface area when the covering material is rolled. The asphalt composition preferably includes an oxidized asphalt with a mineral filler, such as limestone, to increase fire resistance. The adhesive composition preferably includes a rubberized asphalt material. Thus, the asphalt composition has a low fuel content compared to the adhesive composition, and an amount of the asphalt composition is about twice an amount of the adhesive composition to improve fire resistance.

The present invention also features a method for making a rolled roofing membrane comprising the steps of providing a web having a top surface and a bottom surface and coating the top surface and the bottom surface of the web with an asphalt composition, wherein the asphalt composition saturates the web. The asphalt composition is scraped from the bottom surface of the web and is scraped from a portion of the top surface of the web to form a clean surface area and an asphalt coated area. The bottom surface of the web is then coated with an adhesive material, forming an adhesive surface area. The adhesive composition is scraped from a portion of the bottom surface of the web opposite the clean surface area. A release backing is applied over the adhesive surface area, and a roofing surface material is deposited on the asphalt coated area. The preferred method further includes the step of applying a parting agent to the portion of the bottom surface opposite the clean surface area to form a parting agent covered surface area.

DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENT

Figure 1:
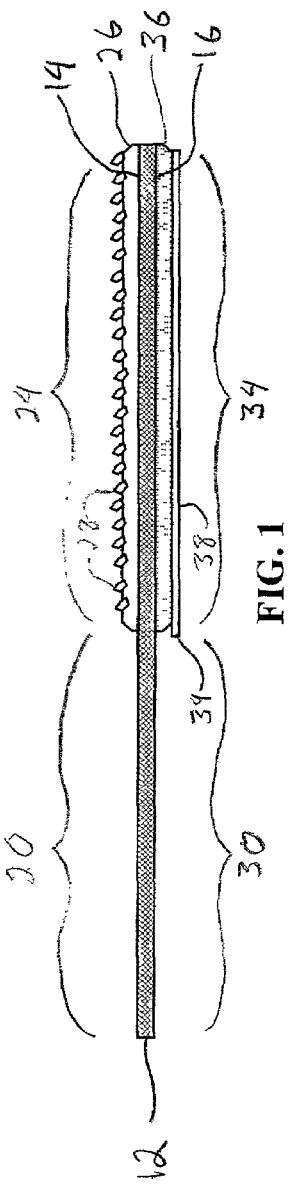
FIG. 1 is a cross-sectional view of a rolled roofing membrane, according to the present invention.

A roofing membrane 10, FIG. 1, according to the present invention, is used to cover a roofing surface by overlapping strips of the roofing membrane 10 forming at least a double coverage roof. The roofing membrane 10 is preferably provided as a rolled membrane. One use for the rolled roofing membrane 10 is on low sloped roofs, for example, having a pitch or rise of ½ to 6 in. per 12 in. of horizontal run. Although these roofs are primarily on residential buildings with wood decks, the roofing membrane 10 can also be used over insulation on metal roofs. The concepts of the present invention described below can also be applied to any type of waterproofing membrane or covering material used to cover a surface.

The roofing membrane 10 includes a substrate 12, such as a fiberglass mat or other fibrous material, that is saturated with an asphalt composition. The top surface 14 of the substrate 12 includes a clean surface area 20 and a decorative or roofing surface area 24. The decorative or roofing surface area 24 includes a layer of asphalt composition 26 and roofing granules 28 or another type of roofing material deposited thereon. The bottom surface 16 of the substrate 12 includes a parting agent covered surface area 30 generally opposite the clean surface area 20 to prevent adherence to the clean surface area 20 when the membrane 10 is rolled. The parting agent can be any substance that resists adherence to the asphalt composition saturating the substrate 12, including, but not limited to, sand, talc, and soap.

The bottom surface 16 also includes an adhesive surface area 34 having a layer of adhesive material 36 generally opposite the roofing surface area 24. The adhesive material 36 is capable of adhering to the clean surface area 20 when strips of the roofing membrane 10 are applied to a roof or other surface such that the roofing surface area 24 (e.g., granules 28) is exposed. A release backing 38, such as a silicone coated polyethylene film, covers the adhesive material 36 to prevent adherence to the roofing surface area 24 when rolled.

In one example, the coatings of the asphalt composition 26 and the adhesive material 36 each have a thickness of about 1/16". Since the asphalt composition also saturates the substrate 12, the asphalt composition amounts to about ⅔ of the coating and the self-adhesive material amounts to about ⅓ of the coating. The asphalt composition 26 is formulated to be hard enough to walk on in warm weather without scuffing and flexible enough to unroll in cold weather without cracking. The asphalt composition 26 preferably includes an oxidized asphalt with mineral filler, such as limestone, and SBS rubber. In one example, the asphalt composition includes about 50% by weight limestone filler, 47% by weight oxidized asphalt, and 3% by weight SBS rubber. This asphalt composition has a fuel content that is low enough to pass the fire test. The high level of limestone filler significantly improves fire resistance in addition to the low level of combustible materials. Other fillers can also be used instead of or together with the limestone filler, and the amount of filler can vary depending upon the application. According to the ASTM needle penetration test, the asphalt composition coating described above preferably has a needle penetration of about 6.5 millimeters.

The adhesive material 36 provides the desired adhesive characteristics but is much softer and is more flammable than the fire resistant asphalt composition 26. The adhesive material 36 is preferably a self-adhesive material, such as rubberized asphalt. In one example, the adhesive material 36 has a formulation of about 8% by weight SBS rubber, 20% by weight filler, 10% by weight oil, and 62% by weight flux asphalt. This adhesive material 36 preferably has a needle penetration of about 55 millimeters, and thus is about 8.5 times softer than the asphalt composition. The adhesive composition is more flammable because of the oil content and the lower filler content. By minimizing the self-adhesive material having a high oil content and by using an oxidized asphalt having a low fuel content and a mineral filler to reduce flow, fire resistance is improved. Because approximately ⅔ of the total coating on the membrane 10 is the fire resistant asphalt, the roofing membrane 10 can have UL Class B or C fire rating without using expensive chemical fire proofing additives.

The clean surface area 20 and parting agent covered surface area 30 prevent adherence when the roofing membrane 10 is rolled while allowing adherence when strips of the roofing membrane 10 are applied to a surface. Because of the low adhesive nature of the oxidized, filled asphalt composition saturating the substrate 12 and because the clean surface area 20 is substantially scraped down to the fibrous material, the clean surface area 20 is substantially free of parting agent when unrolled. As a result, the adhesive material 36 adheres better to the clean surface area 20 in use. In one embodiment, the parting agent covered surface area 30 can include a thin layer of adhesive material such that the parting agent bonds to the adhesive material further preventing the parting agent from releasing and adhering to the clean surface area 20.

Figure 3:
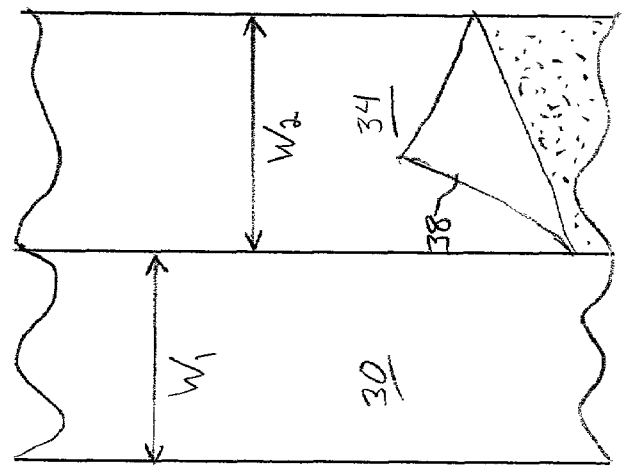
FIG. 3 is a bottom view of the rolled roofing membrane, according to the present invention.
Figure 2:
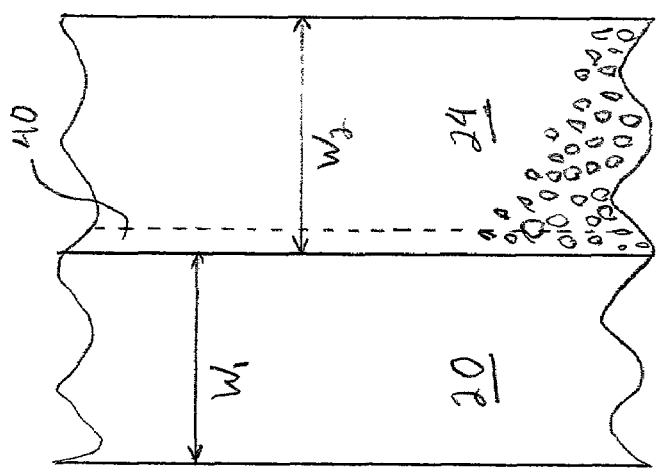
FIG. 2 is a top view of the rolled roofing membrane, according to the present invention.

In one example, shown in FIGS. 2 and 3, the roofing membrane 10 has a width W of about 36 in., the clean surface area 20 and the parting agent covered surface area 30 have a width $w_1$ of about 17 in., and the roofing surface area 24 and adhesive area 34 have a width $w_2$ of about 19 in. This embodiment allows a fastening region 40 (e.g., a strip of about 2 inches) on the roofing surface area 24 used for nailing two overlapping membranes together with greater than double coverage, as described in greater detail below. In this example, the release backing 38 has a width of about 20 in. such that the release backing 38 has a small portion 39 extending just beyond the adhesive material 36. The width of the clean surface area 20, adhesive surface area 34, roofing surface area 24, and parting agent covered surface area 30 can vary to provide varying coverage. The overall width of the roofing membrane 10 can also be varied depending upon the size of the roof and the preferred size of the product.

Figure 4:
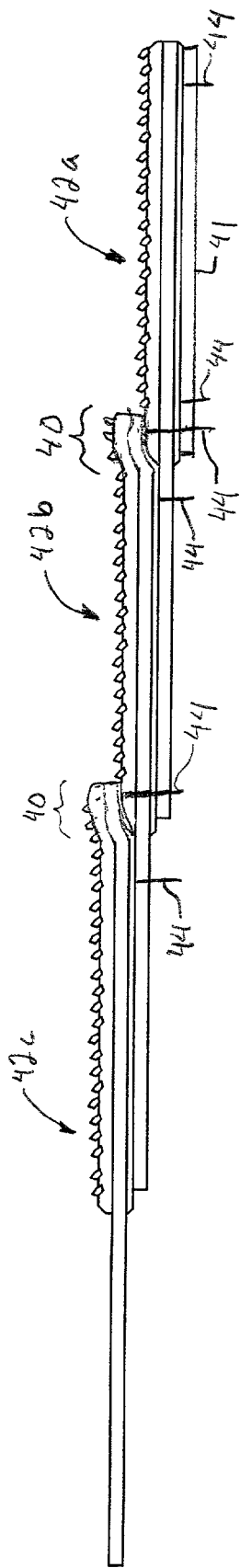
FIG. 4 is a side view of overlapping roofing membranes, according to the present invention.

In use, overlapping strips 42a-c, FIG. 4, of the roofing membrane 10 are applied to the roof or other surface. Initially, a section 41 of the membrane 10 having the clean surface area 20 is cut, applied to the roof and secured (e.g., by nailing) so that the first strip 42a can adhere to the clean surface area 20. The first strip 42a is unrolled and placed substantially parallel to the edge of the surface to be covered. The strip 42a of the roofing membrane 10 is then fastened to the surface, for example, by driving fasteners 44, such as nails, screws or the like, through the clean surface area 20 of the strip 42a into the surface to be covered below. The strip 42a of the roofing membrane 10 is then flipped back to remove the release backing 38 from the adhesive material 36, and the exposed adhesive material 36 is bonded to the surface. Additional fasteners 44 can then be used to further secure the strip 42a, for example, by nailing through the fastening region 40.

The second strip 42b of roofing membrane 10 can then be aligned with the first strip 42a of roofing membrane 10 already in place. The second strip 42b preferably overlaps the fastening region 40 on the first strip. Once aligned, fasteners 44 are used to secure the second strip 42b in place. The release backing 38 is then removed to expose the adhesive material 36, and the exposed adhesive material 36 is adhered to the clean surface area 20 of the first strip 42a. Additional fasteners 44 can then be used at the fastening region 40 such that the fasteners 44 extend through both the second strip 42b and the first strip 42a beneath the second strip 42b.

This process can be repeated until the entire roof or other surface has been covered with overlapping strips 42. According to this exemplary method, the overlapping strips 42a-c provide triple coverage in the fastening region 40. A water tight seal is formed by the overlapping strips of roofing membrane 10 since the adhesive surface area 34 overlaps and bonds to the clean surface area 20 of an adjacent strip of roofing membrane 10.

The use of an adhesive material 36 and release backing 38 on only a portion of the bottom surface 16 of the roofing membrane 10 facilitates this process of applying the strips since each strip of roofing membrane can be secured to the surface (e.g., with nails) and aligned prior to adhering. This improvement makes installation of self-adhesive rolled covering material easier, less labor intensive, and more accurate as compared to roofing membranes where the entire bottom surface is covered with adhesive.

Figure 5:
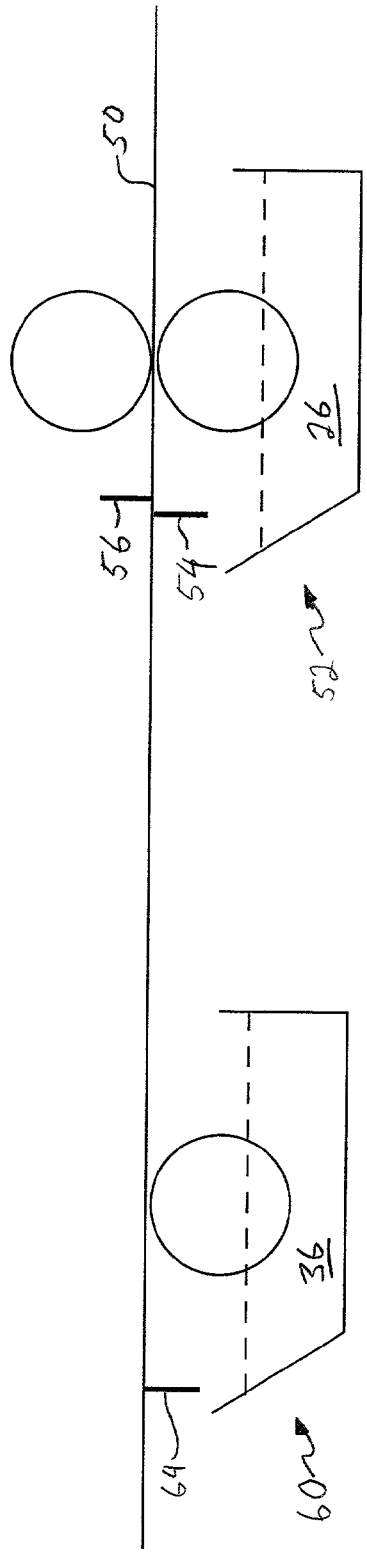
FIG. 5 is a schematic diagram of a system for making the roofing membrane, according to one embodiment of the present invention.

One method of making the roofing membrane 10 uses a two step coating process, as shown in FIG. 5. A fiberglass web 50 (or other type of substrate) travels through a first coater 52 and is uniformly coated on the top and bottom surfaces with the asphalt composition 26. After coating with the asphalt composition 26, the first scraper 54 removes the asphalt composition coating down to the fiberglass web 50 across the entire bottom surface of the web 50. A second scraper 56 removes the asphalt composition coating down to the mat from one side of the top surface of the web 50 to form the clean surface area 20 and leaving a layer of asphalt composition 26 on the other side to form an asphalt coated area.

The fiberglass web 50 then travels through a second coater 60 and the bottom surface of the web 50 is uniformly coated with the adhesive composition 36. A third scraper 64 then removes the adhesive composition coating from one side of the web opposite the clean surface area 20. As the coated fiberglass web 50 continues, the asphalt coated area on the top surface is covered with roofing granules to form the roofing surface area 24, and the piece of rubberized asphalt area on the bottom side of the web 50 is covered by a removable silicon coated polyethylene release sheet (not shown). The scraped area on the bottom surface of the web 50 opposite the clean surface area 20 is covered with a parting agent to form the parting agent covered surface area 30.

According to one example, the roofing granules can be deposited using the system and method described in U.S. Pat. No. 5,814,369 or in U.S. application Ser. No. 08/993,506, both incorporated herein by reference, or using other conventional systems and methods.

Accordingly, the rolled roofing membrane of the present invention provides fire resistant qualities without requiring expensive chemical fireproofing additives, facilitates installation, and improves adhesion when applied to a roof or other surface.

Modifications and substitutions by one of ordinary skill in the art are considered to be within the scope of the present invention which is not to be limited except by the claims which follow.

What is claimed is:

1. A composite asphalt sheet of rolled roofing material comprising:
    a substrate saturated with a first asphalt composition, said substrate including a first region and a second region wherein
        the first region has
            an second asphalt composition layer contacting an upper surface of the first region and granules contacting an upper surface of said second asphalt composition and
            an adhesive composition layer contacting a lower surface of the first region and a release backing disposed over a bottom surface of said second layer; and
        the second region has
            an upper surface of the second region substantially free of the second asphalt composition and
            a lower surface of the second region substantially free of the adhesive composition.

2. The rolled roofing material of claim 1 further including a parting agent covering only said lower surface of said second region, wherein said parting agent resists adhering to said upper surface of said second region when said roofing material is rolled.

3. The rolled roofing material of claim 1 wherein said substrate includes a fibrous material.

4. The rolled roofing material of claim 1 wherein said substrate is a fiberglass mat.

5. The rolled roofing material of claim 1 wherein said first asphalt composition and said second asphalt composition are the same.

6. The rolled roofing material of claim 1 wherein said first and said second asphalt composition include an oxidized asphalt with a mineral filler to increase fire resistance.

7. The rolled roofing material of claim 6 wherein said mineral filler is limestone.

8. The rolled roofing material of claim 1 wherein said adhesive composition layer includes a rubberized asphalt material.

9. The rolled roofing material of claim 1 wherein said adhesive composition layer includes by weight about 8% styrene butadiene styrene rubber, about 20% filler, about 10% oil, and about 62% flux asphalt.

10. The rolled roofing material of claim 1 wherein said first and said second asphalt compositions each have a fuel content wherein said fuel content low enough such that said first and said second asphalt compositions are fire resistant.

11. A composite asphalt roofing material prior to overlapping application on a roof comprising:
    a substrate saturated with a first asphalt composition having an upper and a lower surface and providing unified structure to the composite roofing material;
    a first layer of a second asphalt composition contacting only a first portion of said upper surface of said substrate, wherein said first layer does not contact at least a second portion of said upper surface and the second portion of said upper surface is disposed along a side edge of said composite roofing material;
    a second layer of an adhesive composition contacting only a first portion of said lower surface of said substrate wherein said second layer does not contact at least a second portion of said lower surface and the second portion of said lower surface is disposed along said side edge;
    granules contacting an outer surface of said first layer; and
    a release backing disposed over a bottom surface of said second layer.

12. The composite roofing material of claim 11 further including a parting agent covering only said second portion of said lower surface, wherein said parting agent resists adhering to said second portion of said upper surface when said composite roofing material is rolled.

13. The composite roofing material of claim 11 wherein said substrate includes a fibrous material.

14. The composite roofing material of claim 11 wherein said first asphalt composition and said second asphalt composition are the same.

15. The composite roofing material of claim 11 wherein said first and said second asphalt composition include an oxidized asphalt with a mineral filler to increase fire resistance.

16. The composite roofing material of claim 11 wherein said adhesive composition layer includes a rubberized asphalt material.

17. The composite roofing material at claim 11 wherein said adhesive composition layer includes by weight about 8% styrene butadiene styrene rubber, about 20% filler, about 10% oil, and about 62% flux asphalt.

18. A composite asphalt sheet of rolled roofing membrane prior to overlapping application on a roof comprising:
   a substrate of fibrous material saturated with a first asphalt composition, said substrate having a first section and a second section with a common edge running lengthwise and perpendicular with the rolling of the roofing membrane wherein the first section has a second asphalt composition layer contacting an upper surface of the first section and granules contacting an upper surface of said second asphalt composition layer and an adhesive composition layer contacting a lower surface of the first section and a release backing disposed over a bottom surface of said adhesive composition and the second section has an upper surface of the second section cleaned of the first asphalt composition and substantially free of the second asphalt composition and a lower surface of the second section cleaned of the first asphalt composition and substantially free of the adhesive composition.

19. The composite rolled roofing membrane of claim 18 further including a parting agent covering only said lower surface of said second section, wherein said parting agent resists adhering to said upper surface of said second section when said composite roofing membrane is rolled.

20. The composite rolled roofing membrane of claim 18 wherein said first asphalt composition and said second asphalt composition are the same.

21. The composite rolled roofing membrane of claim 18 wherein said first and said second asphalt composition include an oxidized asphalt with a mineral filler to increase fire resistance.

22. The composite rolled roofing membrane of claim 18 wherein said adhesive composition layer includes by weight about 8% styrene butadiene styrene rubber, about 20% filler, about 10% oil, and about 62% flux asphalt.

* * * * *